(No Model.) 2 Sheets—Sheet 1.
J. M. ESTABROOK.
BELT SUSPENDING DEVICE.
No. 290,219. Patented Dec. 18, 1883.
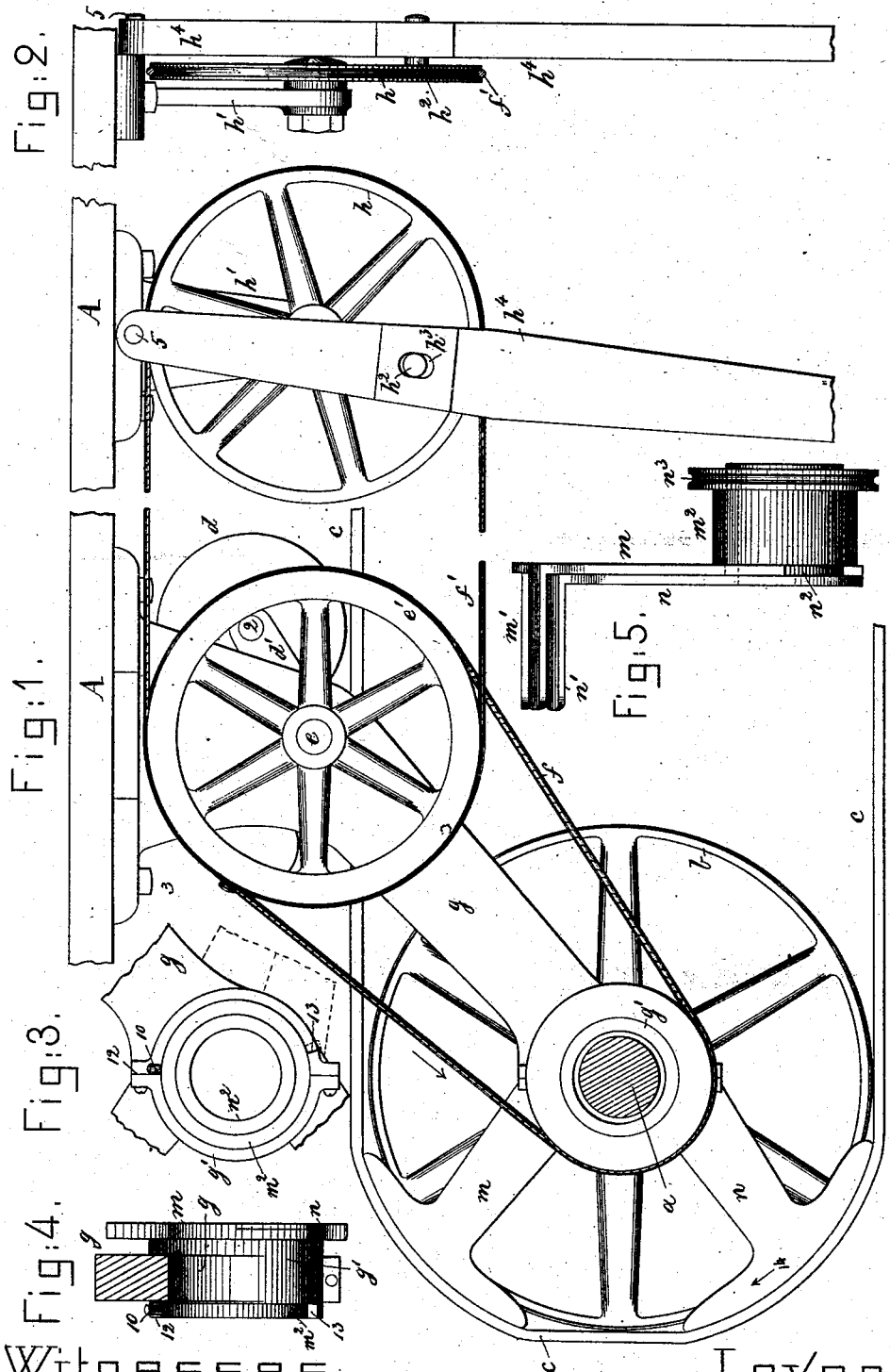
Witnesses:
Fred A. Powell
John F. C. Vrienbert
Inventor.
Joseph M. Estabrook
by Crosby & Gregory attys.

(No Model.) 2 Sheets—Sheet 2.
J. M. ESTABROOK.
BELT SUSPENDING DEVICE.
No. 290,219. Patented Dec. 18, 1883.
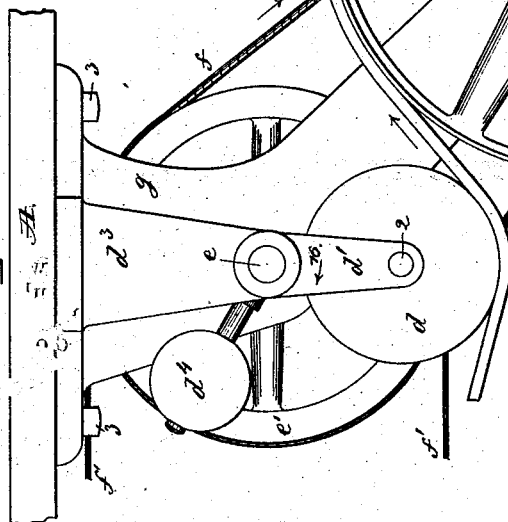
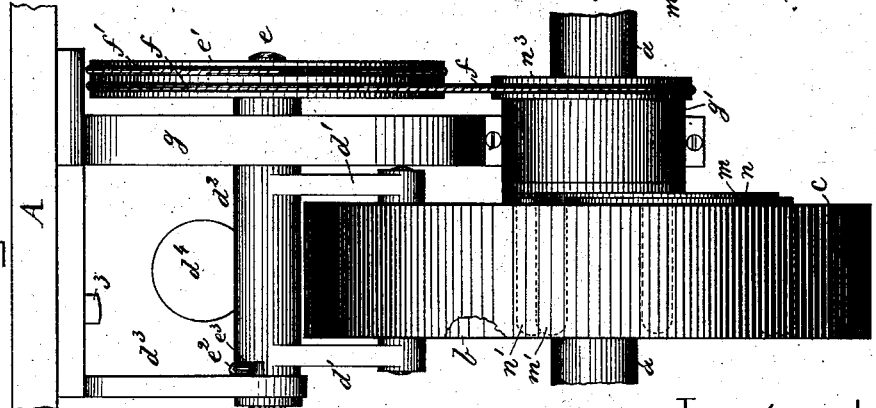
Witnesses. Inventor.
Fred A. Powell Joseph M. Estabrook
John F. C. Prendirch by Crosby & Gregory attys.

UNITED STATES PATENT OFFICE.

JOSEPH M. ESTABROOK, OF MILFORD, MASSACHUSETTS.

BELT-SUSPENDING DEVICE.

SPECIFICATION forming part of Letters Patent No. 290,219, dated December 18, 1883.

Application filed June 18, 1883. (No model.)

*To all whom it may concern:*

Be it known that I, JOSEPH M. ESTABROOK, of Milford, county of Worcester, State of Massachusetts, have invented an Improvement in Belt-Suspending Devices, of which the following description, in connection with the accompanying drawings, is a specification, like letters on the drawings representing like parts.

My invention has for its object the production of a mechanism by which to suspend a belt about the pulley which drives it, when the belt is to remain at rest, thus obviating the employment of a loose pulley at the side of the belt-driving or fast pulley, and of belt-shipping devices to move the belt from the fast to the loose pulley when the belt is to remain at rest.

In this my invention I have shown the belt-suspending device as composed of two arms arranged at one side of the driving-pulley, the said arms being provided with lateral projections, rods, or fingers, adapted to be introduced between the driving-pulley and the belt, the said projections, rods, or fingers serving to take the belt up from the pulley and suspend it about but out of contact from the said pulley, a suitable belt-tightening device at such time giving up necessary slack in the belt to thereby permit the projections, rods, or fingers to be introduced between the belt and the pulley.

My invention consists, essentially, in the combination, with a driven pulley, of belt-suspending mechanism adapted to be placed between the periphery of the said pulley and the belt driven by it, to suspend the said belt about the said pulley.

My invention also consists in the combination, with a driven belt-pulley and a belt-tightening device, of a belt-suspending device or apparatus adapted to be inserted between the periphery of the said pulley and the belt thereon, and to suspend the said belt about the said pulley, as will be described; also, in other features of construction, as will be hereinafter set forth and specified in the claims.

Figure 1 in side elevation represents a sufficient portion of a line of shafting, hangers, belts, &c., to illustrate one practical embodiment of my invention, the belt being shown as suspended; Fig. 2, a partial right-hand end view of Fig. 1; Figs. 3 and 4, details of the box to support the hubs of the arms of the belt-suspending device, the said hubs being shown as in the box; Fig. 5, a detail in side view of the belt-suspending arms and their projections, rods, or fingers; Fig. 6, a partial side elevation of my improved apparatus with the belt applied to the driving-pulley and the belt-tightener resting on the belt to hold it closely to the pulley; Fig. 7, a partial right-hand end view of Fig. 6, and Fig. 8 a detail showing the suspending devices closed together.

The shaft $a$, supposed to be a driven shaft, and supported at proper points by usual boxes and hangers from the ceiling, has attached to it one or more driving-pulleys, $b$. Each pulley $b$ will drive an endless belt, $c$, which will be pressed in contact with the pulley with more or less force, according to the work to be done, by a belt-tightener composed of a roller, $d$, on a pin or stud, 2, of arms $d'$, projecting from a rocking sleeve, $d^2$, slotted for a portion of its periphery, as at $e^3$, to receive a pin, $e^2$, on a shaft, $e$, having its bearings in hangers $d^3$ $g$, attached by suitable bolts, 3, to the ceiling A. The shaft $e$ has fast upon it, as herein shown, a pulley, $e'$, having two grooves, one to receive a band or cord, $f$, and the other a band or cord, $f'$. The endless band or cord $f'$ is extended over a pulley, $h$, supported on a stud in a hanger, $h'$. (See Figs. 1 and 2.) The pulley $h$ has a pin, $h^2$, which enters a hole, $h^3$, in a hand-lever, $h^4$, pivoted at 5, so that as the lever $h^3$ is turned it acts on the pin $h^2$ and partially rotates the pulley $h$, so that the cord or band $f'$, one part of which is attached to the pulley $e'$, partially rotates the said pulley, and causes the band or cord $f$ to be moved, and after the pulley $e'$ is started the pin $e^2$ of the shaft $e$ meets a part of the sleeve $d^2$ and turns it, thereby lifting the bell-tightener $d$ from the belt $c$, or moving the said belt-tightener from its position Fig. 6 to the position Fig. 1, thus slackening the belt $e$, in order that it may be suspended, as will be described.

The hanger $g$, at its lower end, has a suitable box, $g'$, of greater diameter than and surrounding the main driven shaft $a$. The belt-suspending device is herein shown as composed of two arms $m$ $n$, the one $n$ being shorter than the one $m$. These arms are provided, respectively, with projections, rods, or fingers $m'$ $n'$, which extend laterally therefrom across the periphery of the driving-pulley $b$, and stand normally, as in Figs. 6 and 8, when the said pulley is driving the belt $e$. The arm $m$ has a sleeve-like hub, $m^2$, extended from it in the direction opposite to that of the projections $m'$, and this hub, externally of the proper diameter to fit the box $g'$, is inserted in the said box and so as to be turned therein. The arm $n$ has a like hub, $n^2$, but of smaller diameter, it in turn being fitted into and so as to turn in the hub $m^2$. The two hubs $m^2$ $n^2$ take their bearings externally. The inner diameter of the hub $n^2$ is greater than the diameter of the shaft $a$, and the hubs $m^2$ $n^2$ are arranged about and so as to be partially rotated about the said shaft. The inner hub, $n^2$, at its outer end has a pulley, $n^3$, over which is passed the band or cord $f$, before described, and as soon as the said band or cord starts the pulley $n^3$ is started, causing the arm $n$ to commence to move in the direction of the arrows thereon in Figs. 6 and 8, the belt-tightener being then lifted, causing the fingers $n'$ to move in the direction of the movement of the belt into the space between the belt and the pulley. During the first part of the movement of the arm $n$ the arm $m$ remains at rest, but as soon as the shoulder 7 of the inner hub, $n^2$, (see Fig. 8,) strikes the shoulder 8 of the hub $m^2$ the arm $m$ is started and moved in unison with the arm $n$, and the projections, fingers, or rods $m'$ are made to follow after the rods $n'$ into the space between the slackened belt $c$ and the pulley $d$, and the movement of the two arms is continued until they reach the positions Fig. 1, when the projections, rods, or fingers $m'$ $n'$ of the said arms will be interposed between the belt $c$, and the periphery of the pulley $b$ in such manner and position that the belt $c$ will be suspended by the said projections, rods, or fingers about but out of contact therewith, so that the said pulley may continue in movement and the belt be held at rest, and this without giving to the belt a lateral movement, so as to place it to one side of the pulley. The extent of movement of the arms $m$ $n$ is determined by a pin, 10, on the inner hub, $n^2$, which strikes shoulders 12 13 on the box or bearing $g'$.

As herein shown, the suspending devices receive their movement through a band or cord and two pulleys; but I desire it to be understood that I do not limit my invention to moving the said suspending device by the means shown, but I may employ other equivalent means—as, for instance, the shaft $e$ and hub $n^2$ may be connected by gearing, so that the oscillation of the pulley $e'$ will oscillate the hub $n^2$, and it will be understood that it is essential and necessary to lift the belt-tightening device or its equivalent at or just before the time that the arms are to be moved or come into position to receive and suspend the belt about the driving-pulley.

I denominate the pulley $e'$, band $f$, and pulley $n^3$ as the mechanism for actuating the belt-suspending devices.

I do not claim moving the belt laterally off from a fast pulley and holding it there until wanted.

Instead of the particular belt-tightening devices shown, I may employ any other well-known devices for a like purpose. When the suspending device is in the position Fig. 1, and it is desired to start the belt, it is only necessary to turn the pulley $e'$ in the proper direction to enable the arm $n$ to be moved in the direction of the arrow 14, (see Fig. 1,) and as a projection on the hub of the arm $n$ reaches a shoulder on the hub of the arm $m$, the latter arm thereafter moves together with the arm $n$ until both arms are brought to rest in the position Fig. 6, where the belt is shown suspended. The movement of the arms $d'$ of the belt-tightening device to remove it from the belt will be in the direction of the arrow 16, Fig. 6, the pin $e^2$, Fig. 7, then striking the shoulders at the front side of the slot $e^3$. The counter-weight $d^4$ normally holds the roller $d$ down on or toward the belt $e$.

I claim—

1. The rotating driving-pulley $b$, combined with belt-suspending apparatus provided with fingers or rods adapted to enter between the belt and the periphery of the said pulley and hold the belt in suspension about the said pulley, substantially as described.

2. The rotating driving-pulley and belt-suspending devices adapted to be introduced between the running belt and the periphery of the said pulley, combined with belt-tightening mechanism, the pressure of which is relieved to slacken the belt as the belt-suspending device is being introduced between the belt and pulley, substantially as described.

3. The shaft $a$, driving-pulley thereon, the box $g'$, surrounding the shaft, and belt-suspending device composed of the arms having hubs sustained by the said box, and provided with projections or rods to be entered between the said pulley and the belt driven by it, combined with means to turn the belt-suspending device into position between the belt and pulley, substantially as described.

4. The shaft $a$, pulley $b$, and hanger $g$ and its box $g'$, combined with the arms $m$ $n$, their hubs $m^2$ $n^2$, and projections $m'$ and $n'$, the said hubs being provided with shoulders 7 8, whereby the arm $n$ may be started and thereafter cause the arm $m$ to follow, substantially as and for the purpose described.

In testimony whereof I have signed my name to this specification in the presence of two subscribing witnesses.

JOSEPH M. ESTABROOK.

Witnesses:
 G. W. GREGORY,
 B. J. NOYES.